(12) United States Patent
Chen (10) Patent No.: US 9,198,037 B2
(45) Date of Patent: Nov. 24, 2015

(54) IDENTIFICATION PROCESSING APPARATUS AND MOBILE DEVICE USING THE SAME

(75) Inventor: Chien-Sheng Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 226 days.

(21) Appl. No.: 13/006,630

(22) Filed: Jan. 14, 2011

(65) Prior Publication Data

US 2012/0001725 A1 Jan. 5, 2012

(30) Foreign Application Priority Data

Jun. 30, 2010 (TW) ............................... 99121592 A (51) Int. Cl.
*G05B 19/00* (2006.01)
*G05B 23/00* (2006.01)
*H04M 1/66* (2006.01)
*H04B 1/16* (2006.01)
*H04K 1/00* (2006.01)
(Continued)

(52) U.S. Cl.
CPC ............ *H04W 12/06* (2013.01); *H04L 63/0492* (2013.01); *H04L 63/08* (2013.01); *H04L 63/0838* (2013.01); *G06F 21/32* (2013.01)

(58) Field of Classification Search
CPC ....... H04L 5/0001; H04L 12/00; H04L 12/66; H04L 2012/00; H04L 7/00; H04L 63/105; H04L 67/04; H04W 8/183; H04W 24/08; H04W 74/002; H04W 12/06; H04W 12/08; H04W 12/02; H04W 8/00; G06F 17/40; G06F 21/32; G06F 21/30; G06F 21/445; G06F 21/60; G06F 21/41; G06F 21/31; G06F 15/00; G06K 7/0004; G06K 1/14; G06K 19/0723; G06K 7/10128; G06K 7/10217; G06Q 20/00; G06Q 20/341; G06Q 20/352; G06Q 20/357; G06Q 20/36; G06Q 20/346; G06Q 20/354; G07F 1/02; H04M 3/00; H04M 2201/00; H04M 2201/42
USPC .................. 340/5.6, 10.1, 10.4, 10.5, 825.69, 340/825.72, 10.41, 572.1, 573.1, 5.1, 5.24, 340/5.23, 5.8; 455/82, 552.1, 41.2, 410, 455/411, 343.3; 235/492, 375, 487, 493, 235/379, 380; 705/72, 14.3, 44, 67, 41, 705/14.63, 14.65; 380/247, 255
See application file for complete search history.

(56) References Cited

U.S. PATENT DOCUMENTS 7,840,817 B2 11/2010 Tagashira
8,190,894 B2 5/2012 Sandberg et al.
(Continued)

FOREIGN PATENT DOCUMENTS

CN 1505425 A 6/2004
CN 101169811 A 4/2008

OTHER PUBLICATIONS

Chinese Office Action dated Mar. 21, 2013, 9 pages.

*Primary Examiner* — Mirza Alam
(74) *Attorney, Agent, or Firm* — Edell, Shapiro & Finnan, LLC (57) ABSTRACT

An identification processing apparatus is provided for performing an identification procedure according to a smart card, including a storage unit for storing a first password; and an authentication unit for determining whether to perform the identification procedure according to a second password and the first password.

18 Claims, 5 Drawing Sheets

(51) Int. Cl.
*H04L 29/06* (2006.01)
*H04W 12/06* (2009.01)
*G06F 21/32* (2013.01)

(56) References Cited

U.S. PATENT DOCUMENTS

| | | | |
|---|---|---|---|
| 8,233,619 B2 | 7/2012 | Bertoni et al. | |
| 8,515,073 B2 | 8/2013 | Arunan | |
| 2004/0236964 A1* | 11/2004 | Haverinen | 713/201 |
| 2005/0177522 A1* | 8/2005 | Williams | 705/72 |
| 2006/0140410 A1 | 6/2006 | Aihara | |
| 2007/0028118 A1* | 2/2007 | Brown et al. | 713/185 |
| 2007/0241182 A1* | 10/2007 | Buer | 235/380 |
| 2008/0014897 A1* | 1/2008 | Cook et al. | 455/343.1 |
| 2009/0191846 A1* | 7/2009 | Shi | 455/411 |
| 2010/0019583 A1* | 1/2010 | Dubose et al. | 307/126 |
| 2010/0138667 A1* | 6/2010 | Adams et al. | 713/186 |
| 2010/0181377 A1 | 7/2010 | Chen et al. | |
| 2010/0190436 A1 | 7/2010 | Cook et al. | |
| 2010/0205425 A1* | 8/2010 | Takacs et al. | 713/100 |
| 2010/0244576 A1* | 9/2010 | Hillan et al. | 307/104 |
| 2010/0279606 A1 | 11/2010 | Hillan et al. | |

* cited by examiner

IDENTIFICATION PROCESSING APPARATUS AND MOBILE DEVICE USING THE SAME

CROSS REFERENCE TO RELATED PATENT APPLICATION

This patent application is based on Taiwan, R.O.C. patent application No. 99121592 filed on Jun. 6, 2010.

FIELD OF THE INVENTION

The present invention relates to an identification processing apparatus, and more particularly, to an identification processing apparatus which perform an identification procedure according to the identification information of a smart card.

BACKGROUND OF THE INVENTION

The Contactless IC card has been adopted in numerous fileds and over the course of time has been widely used in connection with traffic, access control systems, and electronic payment, among other fields. In recent years, and in light of requirements in Mass Rapid Transit, Logistics Management, product Anti-counterfeiting, identity identification etc., Contactless IC card technology has experienced continuous improvements, and is being applied in increasingly diversified ways. Similarly, mobile devices have also seen rapid development, and are now carried by numerous people. Recent mobile devices have included RF ID technology. Specifically, a mobile phone may have an electronic payment function that integrates both RFID technology and mobile communication technology.

Near field communication (NFC) technology is a short-range technology for wireless communication, which conforms to the ISO/IEC 18092 and ISO/IEC 21481 standard, its operating frequency is 13.56 MHz, and its communication distance is cm-level. Electronic devices can perform Duplex service by using the NFC technology, and perform Contactless exchanging, digital data accessing and coupling to other NFC device through the single touch mode. That is, NFC technology is a technology that combines contactless identification and interconnection and, as such, it can also be regarded as one type of radio frequency identification (RFID) technology. NFC technology is deduced from the contactless smart card (CSC) technology, and it may conform to the ISO/IEC 14443 type A standard. Thus, an electronic device with NFC function may be a tool in the context of electronic payment in commercial trade.

The application of the NFC technology may be roughly divided into three types as follows:

1. Touch and Go Mode: applied to identity identification and electronic tickets, such as access control, login information system, document signing, card system, bus ticket or entrance ticket etc. The user only need to carry the NFC apparatus storing the identity identification data or the electronic tickets data close to the reading apparatus (such as a card reader). In addition, it can be used for data capturing, such as obtaining a website directly from a "smart poster."
2. Touch and Confirm Mode: applied to mobile business payment system, the consumer uses the NFC apparatus for payment trade. Such an NFC apparatus may store the information of a credit card, Value Card or Electronic Purse etc., for electronic payment trading.
3. Touch and Connect Mode: applied to coupling between two NFC apparatus, for peer-to-peer (P2P) transmitting, such as music downloads, image exchange and address book synchronous processing etc.

Figure 1:
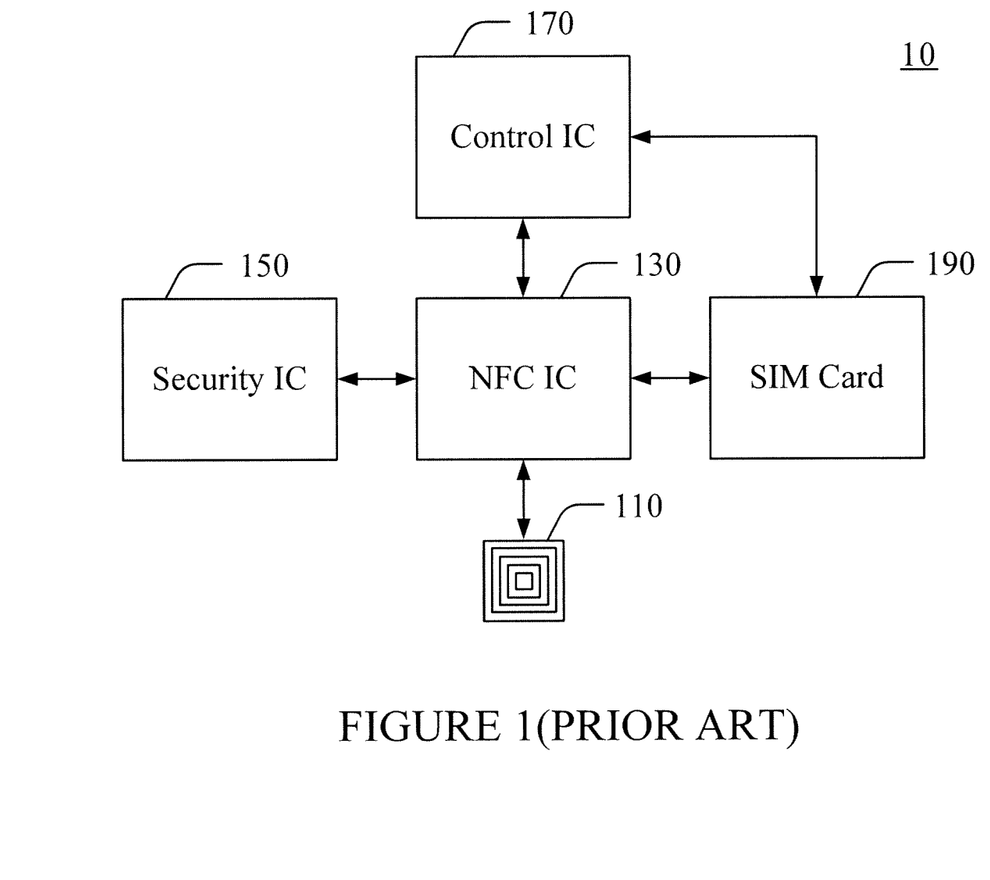
FIG. 1 is a function block diagram of a mobile phone with NFC payment function in accordance with the prior art.

FIG. 1 is a function block diagram of a mobile phone with NFC payment function according to the prior art. The mobile phone 10 comprises an antenna 110, a NFC IC 130, a security IC 150, a control IC 170 and a subscriber identity module (SIM) card 190. The security IC 150 is used for storing authentication data, and the control IC 170 and the SIM card 190 are used for phone operations.

When a user wants to perform an identification procedure in connection with an electronic payment, the mobile phone 10 is brought close to a NFC card reader (not showing). The mobile phone 10 receives the data from the card reader by the antenna 110. Next, the NFC IC 130 performs the identification procedure according to the data transmitted by the card reader and the authentication data stored in the security IC 150, in the identification procedure, the NFC IC 130 can communicate with the card reader by the antenna 110, and transmits the authentication data stored in the security IC 150 to the card reader, for achieving electronic payment function.

Since the security IC 150 is fixed in the mobile phone 10 (so the user can't transform the authentication data stored in the security IC 150 to a new mobile phone), when changing the mobile phone, for example, the stored-value balance, the information of the Electronic Purse, the information of the access control, the information of the bank account and the information of the traffic ticket etc. are all unable to be transferred to a new mobile phone for seamless usage. In addition, the power of the NFC IC 130 is supplied only by the battery (not shown) of the mobile phone 10, such that the NFC IC 130 can not work when the battery is dead. For example, if the mobile phone 10 is used for traffic ticket, when the battery of the mobile phone 10 is dead, there will be trouble when performing the identification procedure of the electronic payment. Furthermore, there are no safety measures for preventing others to perform the identification procedure of the electronic payment, e.g., when the mobile phone 10 is lost. As such, there is a risk of theft as well.

SUMMARY OF THE INVENTION

The present invention is aimed to resolve the problem that the electronic payment function may be subject to theft by others as the mobile device has no safety measures for preventing others to perform the identification procedure of the electronic payment.

According to one embodiment of the present disclosure, an identification processing apparatus is provided, for performing an identification procedure according to a smart card, the identification processing apparatus comprises a storage unit for storing a first password; and an authentication unit for determining whether to perform the identification procedure according to a second password and the first password.

According to another embodiment of the present disclosure, a mobile device is provided, the mobile device comprises a smart card, an input unit for inputting a first password, and an identification processing apparatus for performing an identification procedure according to the smart card, the identification processing apparatus includes a storage unit for storing a second password; and an authentication unit for determining whether to perform the identification procedure according to the first password and the second password.

According to the present disclosure, an electronic payment means is enabled with a mobile device, whether the mobile device is on or off, and whether the battery is working or dead. Further, even if the mobile device is lost, the electronic payment function may be protected from theft.

The advantages and spirit related to the present invention can be further understood via the following detailed description and drawings.

Following description and figures are disclosed to gain a better understanding of the advantages of the present invention.

DETAILED DESCRIPTION OF THE PREFERRED EMBODIMENT

The NFC technology includes two parts: a NFC apparatus and a security IC. The security IC may be a smart card according to the difference of the application requirement, such as a SIM card, SD card, SAM card or other IC card.

As noted, while a mobile phone that has electronic payment function, and utilizing the NFC technology may be convenient, if the mobile phone is lost, there is a risk that the electronic payment function may be used without authorization. However, the present invention provides a system and methodology wherein whether the mobile phone is on or off, or whether the battery is working or dead, the electronic payment function can still be performed. Also, in the event the mobile phone is lost, the electronic payment function will be precluded from being used unless a password is first input as well as an authentication is done, thus reducing the possibility of theft.

Figure 2:
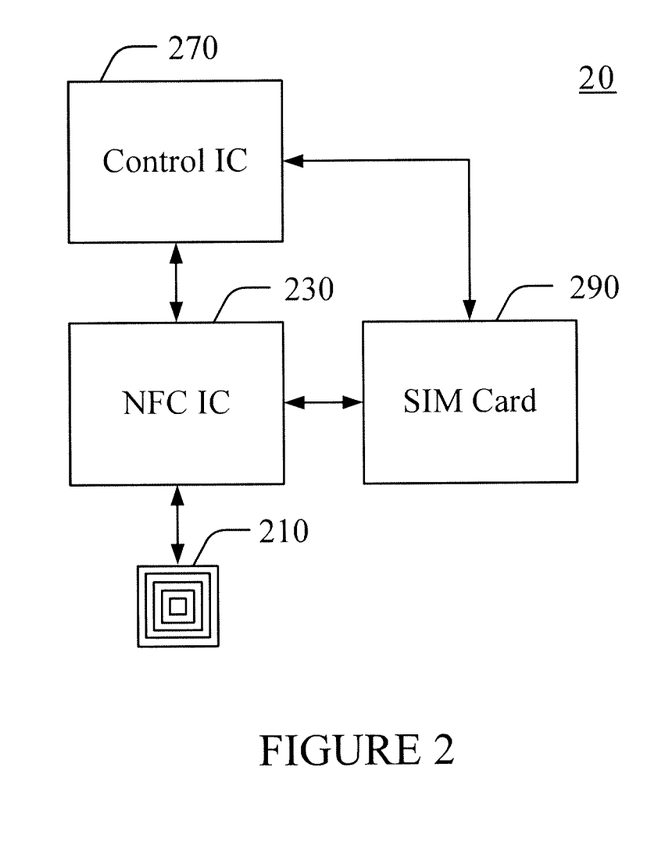
FIG. 2 is a function block diagram of another mobile phone with NFC payment function.

FIG. 2 is a function block diagram of a mobile phone with NFC payment function. The mobile phone 20 comprises an antenna 210, a NFC IC 230, a control IC 270 and a SIM card 290. The functions of the antenna 210, the NFC IC 230 and the control IC 270 are respectively similar to those of the antenna 110, the NFC IC 130 and the control IC 170 in FIG. 1, where the difference is that the SIM card 290 has the function of the security IC 150, besides the SIM card function, that is, the SIM card 290 is a smart card, in that it integrates the function of the security IC into the SIM card 290.

When a user wants to perform an identification procedure of an electronic payment, the NFC IC 230 may wirelessly communicate with a NFC card reader (not showing) according to the authentication data stored in SIM card 290, for performing the identification procedure.

Since the SIM card 290 has been integrated with the function of the security IC 150, the user can transfer the authentication data stored in SIM card 290 of the mobile phone 20 to a new mobile phone, if so desired. In addition, the NFC IC 230 may be coupled to SIM card 290 by single wire protocol (SWP) interface; therefore, the power for the NFC IC 230 may be supplied by the battery (not showing) of the mobile phone 20, and, as well, the power for the NFC IC 230 can be generated by the wireless signal from near field device. Thus, the NFC IC 230 can still communicate with the SIM card 290 through the SWP interface utilizing the power generated by the wireless signal, even though the battery of the mobile phone may be dead, and thus enable electronic payment.

Figure 3:
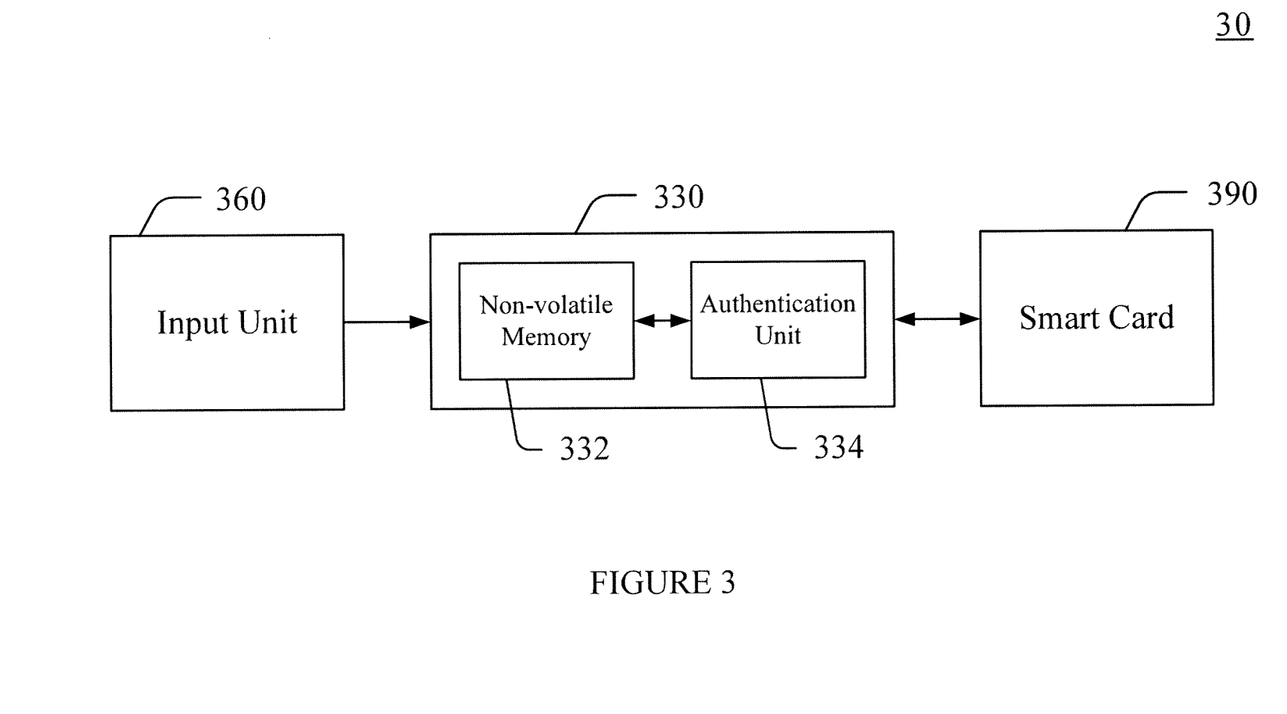
FIG. 3 is a function block diagram of the mobile device according to an embodiment of the present disclosure.

FIG. 3 is a function block diagram of a mobile device according to an embodiment of the present disclosure. The mobile device 30 comprises an identification processing apparatus 330, an input unit 360 and a smart card 390. The identification processing apparatus 330 includes a storage unit 332 and an authentication unit 334.

For example, the mobile device 30 may be a mobile phone with electronic payment function or a personal digital assistant (PDA), the identification data of the electronic payment is stored in the smart card 390, wherein, the identification data may be credit card information, Value Card information or Electronic Purse information etc., the identification procedure may be a mobile business payment identification procedure, an identity identification procedure, an electronic ticket identification procedure or a P2P transmitting identification procedure etc., and the storage unit 332 may be a non-volatile memory (NVM), such as a flash memory or an electrically-erasable programmable read-only memory (EEPROM). The password stored in the storage unit 332 can be changed according to the user requirement, and whether the battery is working or dead, the password can persist.

The identification processing apparatus 330 is used for communicating with a card reader of the identification system, for performing an identification procedure, and when the mobile device 30 employs a NFC system, the identification processing apparatus 330 may be a NFC apparatus. In the embodiment of the present disclosure, the user may preset an authentication password in advance, before performing the electronic payment action. Password authentication in connection with the identification processing apparatus 330 is needed before performing the identification procedure according to the identification data stored in the smart card 390. Identification data stored in the smart card 390 will not be read unless the password authentication of the identification processing apparatus 330 has been successfully completed. In this way, the system can preclude other, unauthorized, people from performing the electronic payment function.

Specifically, before the identification apparatus 330 performs the identification procedure according to the identification data stored in the smart card 390, the authentication unit 334 compares the password stored in the storage unit 332 with the password input by the user through the input unit 360. If the password stored in the storage unit 332 is equal to that input by the user, the identification apparatus 330 may perform the identification procedure, and if not, the identification apparatus 330 can not perform the identification procedure.

In a preferred embodiment, the authentication password stored in the storage unit 332 can be encrypted, and when the identification apparatus 330 performs the identification procedure, the authentication unit 334 can decrypt the authentication password stored in the storage unit 332, and then perform the password authenticating. For example, the authentication unit 334 may decrypt the authentication password using the advanced encryption standard (AES) or the triple data encryption standard (3DES).

Figure 4:
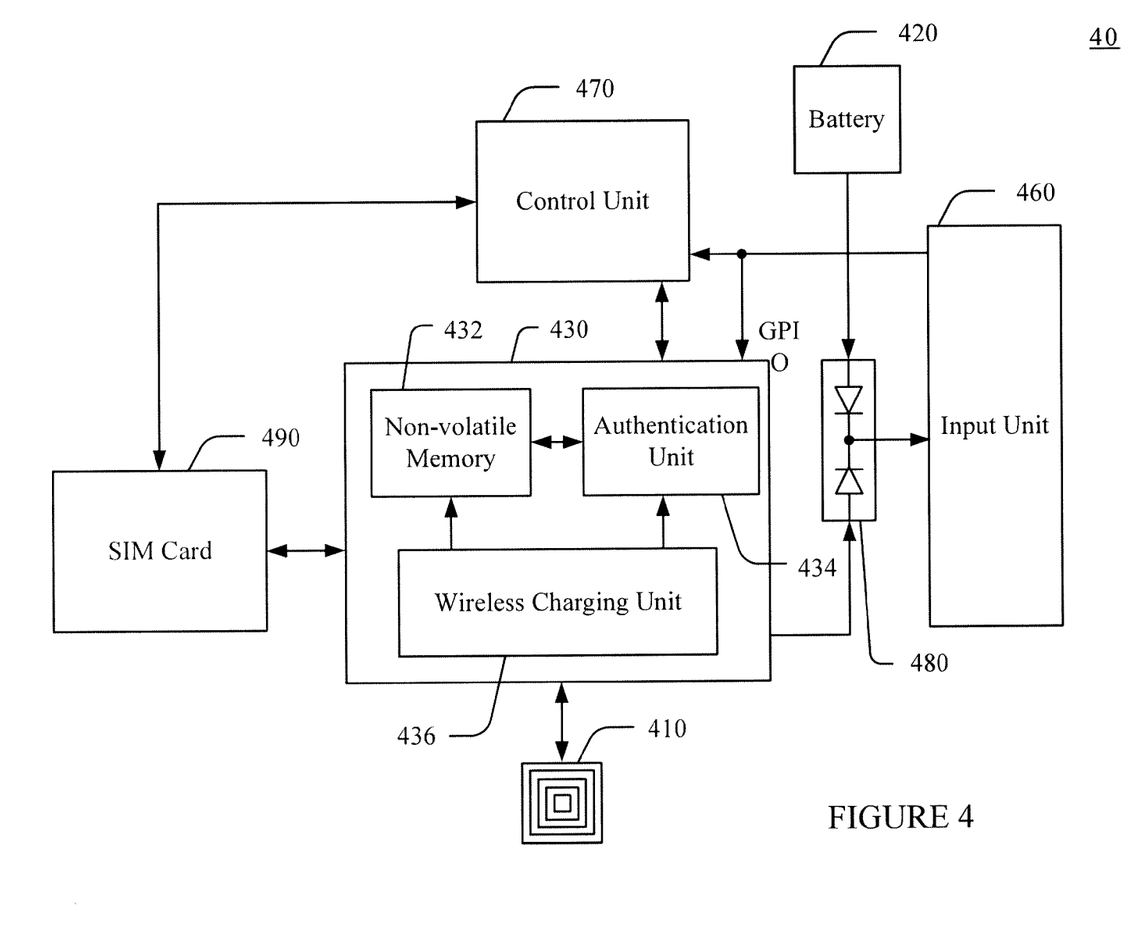
FIG. 4 is a function block diagram of the mobile device according to another embodiment of the present disclosure.

FIG. 4 a function block diagram of the mobile device according to another embodiment of the present disclosure. The mobile device 40 comprises an antenna 410, a battery 420, an identification processing apparatus 430, an input unit 460, a control unit 470, a power protective unit 480 and a SIM card 490. The identification processing apparatus 430 includes a storage unit 432, an authentication unit 434 and a wireless charging unit 436.

The SIM card 490 is used for storing the identification data, the input unit 460 may be coupled to the identification apparatus 430 and the control unit 470 through the general purpose input/output (GPIO) for inputting data (via, e.g., a keyboard of a mobile phone, a touch keyboard or a touch pen etc.), the control unit 470 is used for processing the base-band digital data of the mobile device 40, controlling the user interface (UI) of the mobile phone, and performing the application (AP).

In the embodiment, the input unit 460 may have many kinds of power supply means, such as utilizing the power generated by the battery 420 or by the wireless signal of the wireless charging unit 436. The power protective unit 480 is used for preventing the power generated by the battery 420 being transferred to the identification apparatus 430, and preventing the power generated by the wireless signal in the identification apparatus 430 being transferred to the battery 420.

The user can set an authentication password in the storage unit 432 to prevent the electronic payment of the mobile device 40 from being used without authorization, and for authenticating whether the user that is performing the electronic payment procedure is the owner of the mobile device 40. More specifically, the user can set or change the authentication password stored in the storage unit 432 by the input unit 460, through the AP or the UI of the mobile device 40 any time.

In addition, the user can set status information, for indicating whether the status of the electronic payment function of the mobile device 40 is on or off. For example, if the status of the electronic payment function is off, the identification apparatus 430 will not perform the electronic payment procedure even the mobile device 40 receives the signal of the NFC apparatus. Only when starting the electronic payment function, the identification apparatus 430 can perform the electronic payment procedure. The mobile device 40 may be set as: it need to input an authentication password first, when starting the electronic payment function, also the user can set the identification processing apparatus 430 to perform the electronic payment procedure directly, without inputting the authentication password, or set as: before performing each electronic payment action, the user need to input the authentication password, and only when passing the password authentication, it can perform the electronic payment procedure. In this case, the electronic payment procedure is that the identification processing apparatus 430 performs the identification procedure using the NFC reading apparatus and the identification data stored in the SIM card 490, after passing the authentication, the NFC reading apparatus performs the deduction or addition etc. action to the stored-value information stored in the SIM card 490, thereby achieving the electronic payment function.

In addition, the mobile device 40 may be set to have an upper threshold about the trade time. If the time that the user performs the electronic payment function is less than the upper threshold, it can perform the electronic payment without inputting the authentication password. However, if the time that the user performs the electronic payment function is greater than the upper threshold, the authentication password may be required before trading for performing the electronic payment procedure. Furthermore, the user may be given the option to reset the number of times the electronic payment procedure has taken place.

It is to be noted that the status information and the upper threshold of the trade time features are not necessary, and the mobile device 40 can also be preset as being in electronic payment status, wherein the password needs to be input before performing each electronic payment function, and only when passing the password authentication, it can perform the electronic payment procedure.

When the mobile device 40 detecting the NFC reading apparatus (not shown) by the antenna 410, the identification processing apparatus 430 may read the status information of the storage unit 432 first. If the status information indicates that the electronic payment function is off, the identification processing apparatus 430 is prohibited from communicating with the NFC reading apparatus. If the status information indicates that the electronic payment function is on, the electronic payment procedure can be performed directly according to the information set by the user, or the user can input the password for passing the password authentication, for performing the electronic payment procedure. For example, when the user wants to perform the electronic payment, the user must to input the password by the input unit 460 first, then the authentication unit 434 compares the input password with the authentication password stored in the storage unit 432. If the input password is equal to the authentication password, the identification processing apparatus 430 can perform the electronic payment, and if the input is different to the authentication password, the identification processing apparatus 430 can not perform the electronic payment. Consequently, the present invention provides a desirable security feature.

When the battery of the mobile device 40 is dead, if the user wants to perform the electronic payment procedure, the wireless charging unit 436 of the identification processing apparatus 430 may supply the power generated by the wireless signal of the NFC reading apparatus for the identification processing apparatus 430 and the input unit 460, for performing the electronic procedure.

Specifically, when the mobile device 40 is off or the battery 420 is dead, and the status information stored in the storage unit 432 indicates that the electronic payment function is off, the mobile device 40 can not perform the electronic payment procedure. In this situation, if the electronic payment function of the mobile device 40 is desired, the wireless charging unit 436 may supply the power generated by the wireless signal of the NFC reading apparatus for the identification processing apparatus 430 and the input unit 460 respectively. Then, the user inputs the password by the input unit 460, and changes the status information stored in the storage unit 432 into that the electronic payment function is on, for performing the electronic payment procedure. If the status information stored in the storage unit 432 indicates that the electronic payment function is on, the identification processing apparatus 430 may perform the electronic payment procedure directly.

Figure 5:
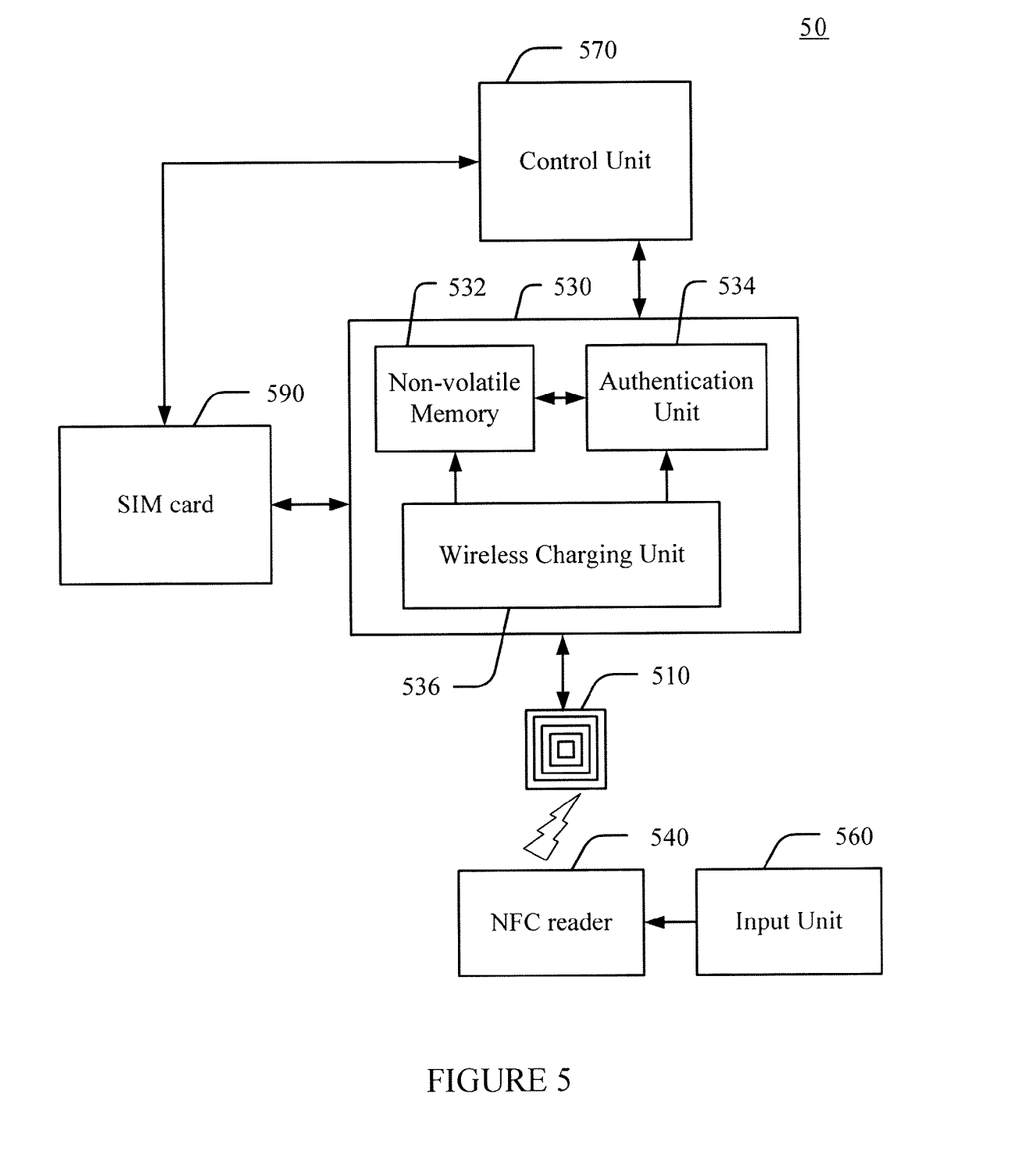
FIG. 5 is a function block diagram of the mobile device according to still another embodiment of the present disclosure.

In addition, if there is another input device coupled to the NFC reading apparatus, the user also can use that input device for inputting the password, for performing the electronic payment procedure or changing the status information stored in the storage 432 for opening or closing the electronic payment function, as shown in FIG. 5. More specifically, FIG. 5 is a function block diagram of the mobile device according to another embodiment of the present disclosure. The mobile device 50 comprises an antenna 510, an identification processing apparatus 530, a NFC reading apparatus 540, an input unit 560, a control unit 570 and a SIM card 590. The identification processing apparatus 530 includes a storage unit 532, an authentication unit 534 and a wireless charging unit 536. The operation of the antenna 510, the identification processing apparatus 530, the control unit 570 and the SIM card 590 are respectively similar to those of the antenna 410, the identification processing apparatus 430, the control unit 470 and the SIM card 490, so it will not describe in detail. The difference between the mobile device 40 and the mobile device 50 is that the mobile device 50 can input a password via the external input device 560.

Specifically, if the status information stored in the storage unit 532 indicates that the electronic payment function is off, the identification processing apparatus 530 can not perform the electronic payment procedure. If it wants to start the electronic payment function of the identification processing apparatus 530, the user may input the password by the input device 560 that is coupled to the NFC reading apparatus 540, then the password is transmitted to the authentication unit 534 of the identification processing apparatus 530 by the antenna 510 for password authentication and, after passing the password authentication, the status information stored in the storage unit 432 can be changed to a status indicating that the electronic payment function is on, so, the identification processing apparatus 530 can perform the electronic payment procedure.

In conclusion, the present disclosure resolves the problem that the electronic payment function may be stolen, or employed, without authorization, by others. Embodiments described herein improve the safety of electronic payment by inputting password to open or close the electronic payment function. And whether the mobile phone is on or off, whether the battery is working or dead, the safety electronic payment function can be performed safely. So, even if the mobile phone is lost, the mobile device owner can avoid a loss as other people will not be able to operate the electronic payment function of the mobile device.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An identification processing apparatus, for use in a mobile device, for performing an identification procedure according to a smart card, comprising:
   a near field communication integrated circuit, comprising:
   non-volatile memory for storing a first password; and
   an authentication unit, coupled to the non-volatile memory, for determining whether to perform the identification procedure according to the first password and a second password,
   an antenna; and
   a wireless charging unit that supplies power to the input interface in the absence of power being supplied from a battery of the mobile device,
   wherein the second password is received at the antenna when powered by the wireless charging unit,
   wherein the wireless charging unit supplies power directly to the near field communication integrated circuit when the battery is dead or the mobile device is turned off, the authentication unit performs the identification procedure when the battery is dead or the mobile device is turned-off, and the second password is received at the antenna when the battery is dead or the mobile device is turned-off,
   wherein the authentication unit of the near field communication integrated circuit has an encryption unit, for encrypting the first password, and upon determining to perform the identification procedure, the encryption unit is used for decrypting the first password again.

2. The identification processing apparatus as claimed in claim 1, wherein the second password is inputted from a wireless reading apparatus wirelessly connected to the identification processing apparatus via the antenna.

3. The identification processing apparatus as claimed in claim 1, wherein the non-volatile memory further stores status information of the identification procedure for determining whether to perform the identification procedure.

4. The identification processing apparatus as claimed in claim 1, wherein the antenna is coupled to the identification processing apparatus via a general purpose input/output (GPIO) port.

5. The identification processing apparatus as claimed in claim 1, wherein the encryption unit decrypts the first password by the advanced encryption standard (AES) or the triple data encryption standard (3DES).

6. The identification processing apparatus as claimed in claim 1, wherein the antenna is a near field communication antenna.

7. A mobile device, comprising:
   a smart card; and
   an identification processing apparatus, coupled to the smart card, for performing an identification procedure according to the smart card, the identification processing apparatus comprising:
   a near field communication integrated circuit comprising:
   a non-volatile memory for storing a first password;
   an authentication unit for determining whether to perform the identification procedure according to the first password and a second password, wherein the second password is received by the mobile device;
   an antenna, and
   a wireless charging unit that supplies power to an input unit of the mobile device in the absence of power being supplied from a,
   wherein the second password is received through the input interface when powered by the wireless charging unit,
   wherein the wireless charging unit supplies power directly to the near field communication integrated circuit when the battery is dead or the mobile device is turned off, the authentication unit performs the identification procedure when the battery is dead or the mobile device is turned-off, and the second password is received via the antenna when the battery is dead or the mobile device is turned-off, and
   wherein the authentication unit is used for encrypting the first password, and upon determining to perform the identification procedure, the authentication unit is used for decrypting the first password again.

8. The mobile device as claimed in claim 7, further including a control integrated circuit, used for generating a control signal, for controlling the closing of the identification processing apparatus.

9. The mobile device as claimed in claim 7, wherein the identification procedure is an electronic payment procedure.

10. The mobile device as claimed in claim 7, wherein the antenna is a near field communication antenna.

11. The mobile device as claimed in claim 7, wherein the non-volatile memory further stores status information of the identification procedure for determining whether to perform the identification procedure.

12. The mobile device as claimed in claim 7, wherein the second password is inputted from a wireless reading apparatus which is wirelessly connected to the mobile device via the antenna.

13. The mobile device as claimed in claim 12, wherein the wireless charging unit wirelessly obtains power from the wireless reading apparatus via the antenna.

14. The mobile device as claimed in claim 7, wherein the smart card is a subscriber identity module card.

15. The identification processing apparatus as claimed in claim 1, wherein the wireless charging unit supplies power to the authentication unit from power received from a near field communication (NFC) signal.

16. The mobile device as claimed in claim 7, wherein the wireless charging unit supplies power to the input interface and the authentication unit from power received from a near field communication (NFC) signal.

17. The identification processing apparatus as claimed in claim 1, wherein the wireless charging unit is incapable of supplying power to the battery.

18. The mobile device as claimed in claim 7, wherein the wireless charging unit is incapable of supplying power to the battery.

* * * * *